(12) United States Patent
Schwarz et al.

(10) Patent No.: US 10,273,965 B2
(45) Date of Patent: Apr. 30, 2019

(54) METHOD OF EXTENDED THERMODYNAMIC TURBINE MAPPING VIA COMPRESSOR INLET THROTTLING

(71) Applicant: BorgWarner Inc., Auburn Hills, MI (US)

(72) Inventors: Jordan Bucklew Schwarz, Mills River, NC (US); David Grabowska, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 134 days.

(21) Appl. No.: 15/230,692

(22) Filed: Aug. 8, 2016

(65) Prior Publication Data

US 2018/0038377 A1 Feb. 8, 2018

(51) Int. Cl.

| | | |
|---|---|---|
| *G01M 15/02* | (2006.01) | |
| *F04D 27/00* | (2006.01) | |
| *G01M 15/00* | (2006.01) | |
| *F01D 21/00* | (2006.01) | |
| *F01D 17/14* | (2006.01) | |
| *F04D 27/02* | (2006.01) | |
| *F02C 7/042* | (2006.01) | |

(52) U.S. Cl.
CPC ......... *F04D 27/001* (2013.01); *F01D 17/146* (2013.01); *F01D 21/003* (2013.01); *G01M 15/00* (2013.01); *F02C 7/042* (2013.01); *F04D 27/0253* (2013.01); *F05D 2220/40* (2013.01); *G01M 15/02* (2013.01)

(58) Field of Classification Search
USPC .............................. 73/114.77, 116.03, 116.04
See application file for complete search history.

(56) References Cited

U.S. PATENT DOCUMENTS

| | | | | |
|---|---|---|---|---|
| 4,034,604 A | * | 7/1977 | Decher | G01L 5/133 |
| | | | | 73/118.02 |
| 4,694,689 A | * | 9/1987 | Kawasaki | G01M 1/04 |
| | | | | 73/114.77 |
| 6,298,718 B1 | * | 10/2001 | Wang | F02D 41/0007 |
| | | | | 701/100 |

(Continued)

FOREIGN PATENT DOCUMENTS

DE    10 2008 031 274 B3    10/2009

OTHER PUBLICATIONS

International Search Report for Application No. PCT/US2017/045682 dated Nov. 7, 2017, 2 pages.

(Continued)

*Primary Examiner* — Eric S. McCall
(74) *Attorney, Agent, or Firm* — Howard & Howard Attorneys PLLC

(57) ABSTRACT

A method for extending thermodynamic turbine mapping of a turbocharger, the turbocharger including a turbine and a compressor, the method including the steps of providing a steady-state turbocharger gas test stand configured to flow continuous gas to the turbocharger, the test stand including a throttle device disposed upstream of an inlet of the compressor of the turbocharger, and varying an area of the inlet with the throttle device to change density of the continuously flowing gas at the inlet of the compressor and establish a choked-flow condition for extending the thermodynamic turbine mapping of the turbocharger.

15 Claims, 4 Drawing Sheets

(56) References Cited

U.S. PATENT DOCUMENTS

| | | | |
|---|---|---|---|
| 7,278,302 B2 | 10/2007 | Rohde | |
| 7,380,445 B2 | 6/2008 | Wood | |
| 8,632,304 B2 | 1/2014 | Sweetland et al. | |
| 9,632,009 B2* | 4/2017 | Berger | G01M 15/14 |
| 2006/0196256 A1* | 9/2006 | Rohde | F02B 37/00 |
| | | | 73/114.01 |
| 2007/0119171 A1* | 5/2007 | Boyapati | F01N 3/021 |
| | | | 60/602 |
| 2008/0209887 A1* | 9/2008 | Hanari | F02B 37/22 |
| | | | 60/277 |
| 2011/0072815 A1* | 3/2011 | Pesiridis | F01D 17/141 |
| | | | 60/615 |
| 2012/0173076 A1* | 7/2012 | Anderson | F02B 39/16 |
| | | | 701/34.4 |
| 2012/0279290 A1* | 11/2012 | Malone | G01M 3/025 |
| | | | 73/114.16 |
| 2013/0008234 A1* | 1/2013 | Vince | G01M 15/09 |
| | | | 73/49.7 |
| 2013/0042451 A1* | 2/2013 | Dellmann | F01D 5/027 |
| | | | 29/402.01 |
| 2014/0007663 A1 | 1/2014 | Berger | |
| 2014/0050573 A1* | 2/2014 | Heidingsfelder | F01D 17/165 |
| | | | 415/183 |
| 2014/0144221 A1* | 5/2014 | Malone | G01M 3/025 |
| | | | 73/114.77 |
| 2015/0355047 A1* | 12/2015 | McCollom | G01M 3/20 |
| | | | 73/40.7 |
| 2016/0047339 A1* | 2/2016 | Kuze | F02D 41/3076 |
| | | | 60/600 |
| 2016/0265425 A1* | 9/2016 | Mart | F01D 17/143 |
| 2017/0030257 A1* | 2/2017 | Wu | F02B 37/04 |
| 2017/0044925 A1* | 2/2017 | Myers | F01D 17/143 |
| 2017/0045008 A1* | 2/2017 | Takaki | F02M 26/00 |
| 2017/0198631 A1* | 7/2017 | Zhang | F02B 37/005 |
| 2017/0260897 A1* | 9/2017 | Ehrhard | F02B 37/04 |

OTHER PUBLICATIONS

English language abstract and machine-assisted English translation for DE 10 2008 031 274 extracted from espacenet.com database on Aug. 25, 2016, 29 pages.

Luefven, Oskar, "Compressor Modeling for Control of Automotive Two Stage Turbochargers", Linkoping Studies in Science and Technology Thesis No. 1463, 2010, pp. 1-28.

* cited by examiner

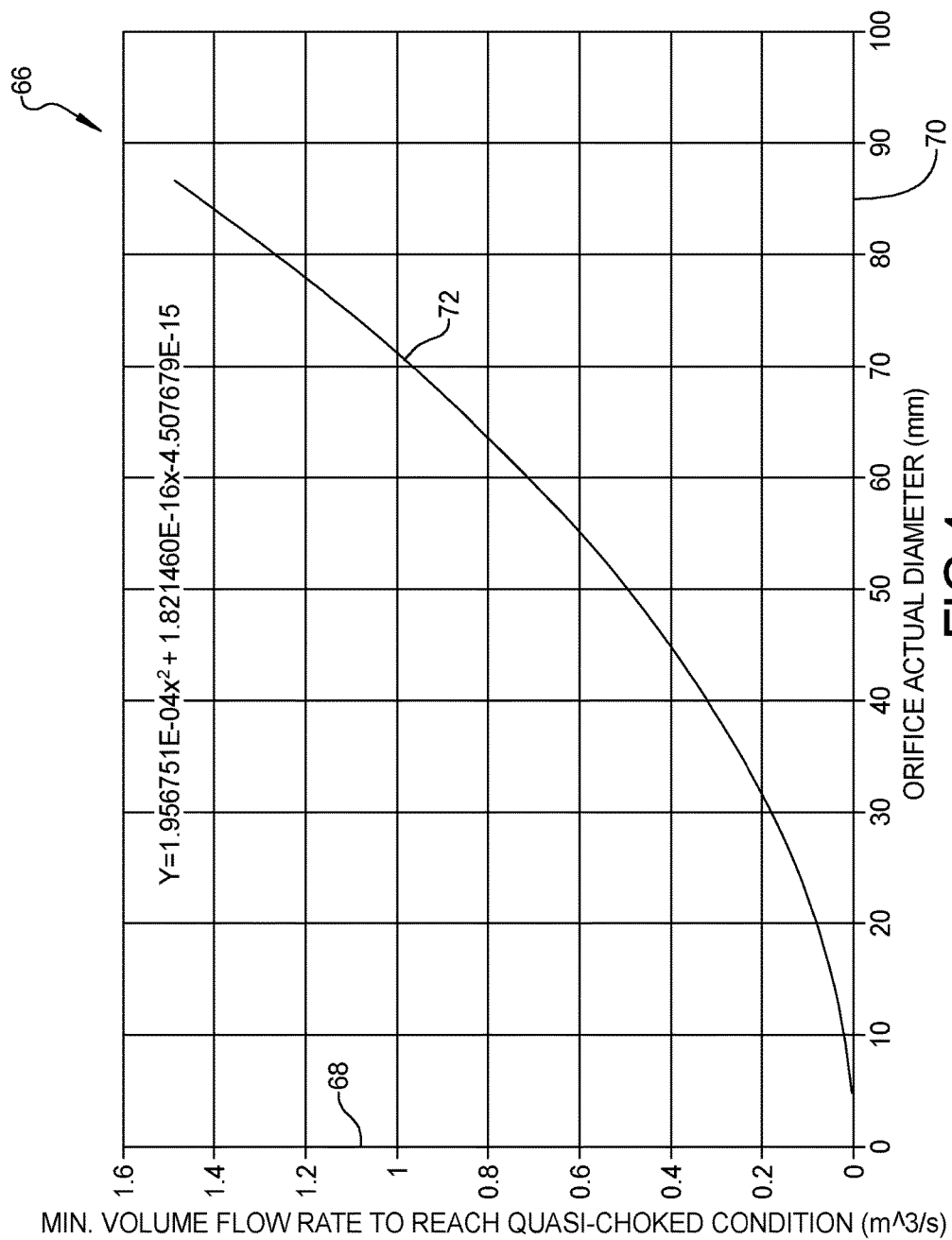

METHOD OF EXTENDED THERMODYNAMIC TURBINE MAPPING VIA COMPRESSOR INLET THROTTLING

BACKGROUND OF INVENTION

1. Field of Invention

The present invention relates generally to thermodynamic turbine mapping for turbochargers and, more specifically, to a method of extended thermodynamic turbine mapping via compressor inlet throttling for a turbocharger.

2. Description of the Related Art

It is known to provide a turbocharger for an engine of a vehicle such as an automotive vehicle. An automotive turbocharger typically consists of a compressor and a turbine on a common shaft supported by bearings in a center housing. The turbocharger extracts some of the energy in the exhaust gas, and transfers this power to the compressor. The compressor increases the intake air density, and thereby the engine power. Turbocharger performance is usually presented in maps using corrected performance variables. The corrections are important since the performance maps are otherwise only valid for the conditions under which they were measured. Turbocharger performance may be measured on an engine in a test stand.

It is also known to provide extended thermodynamic turbine mapping of a turbocharger. Extended turbine maps are needed as inputs to numerical engine power simulations. Extended thermodynamic turbine maps provide more accurate inputs to engine power simulations. In the absence of extended thermodynamic turbine maps, existing thermodynamic maps are extrapolated, and this practice is inaccurate, leading to false assumptions about turbocharger-engine system performance. Existing methods to obtain extended thermodynamic turbine maps require expensive equipment or dedicated facilities.

It is further known to provide a method for functional testing of turbochargers. An example of such a method is disclosed in U.S. Patent Application Publication No. 2014/0007663 to Berger. In this method, exhaust gas turbocharger are subjected to pressurized gas and operated thereby. The test turbocharger is integrated in a testing device and is subjected by means of this testing device only in a pulse-like manner to a gas, preferably compressed air, wherein from the dynamic behavior of the test turbocharger resulting from the at least one gas pressure pulse, potential errors are determined.

However, it is desirable to accurately characterize turbine performance over a wide range of expansion ratios. To accomplish this, it is known to provide a compressor closed loop unit (CCLU) as a means to extend thermodynamic turbine maps for turbochargers. However, this CCLU is more expensive and complex to retrofit to existing gas test stand, which is undesired. Further, current extended thermodynamic turbine maps obtained on conventional gas stand test stands can only span a narrow subset of the expansion ratio.

Therefore, it is desirable to provide a new method to obtain extended thermodynamic turbine maps for turbochargers on existing gas stand test benches. It is also desirable to provide a method that is capable of changing an inlet density for a compressor of a turbocharger to extend thermodynamic turbine maps for turbochargers. It is further desirable to provide a method that can be implemented on any conventional gas test stand at low cost. Thus, there is a need in the art to provide a method of extended thermodynamic turbine mapping via compressor inlet throttling for a turbocharger.

SUMMARY OF THE INVENTION

The present invention provides a method for extending thermodynamic turbine mapping of a turbocharger. The turbocharger includes a turbine and a compressor. The method includes the steps of providing a steady-state turbocharger gas test stand configured to flow continuous gas to the turbocharger. The test stand includes a compressor inlet run having a throttle device disposed upstream of an inlet of the compressor of the turbocharger, and varying an area of the inlet with the throttle device to change density of the continuously flowing gas at the inlet of the compressor and establishing a choked-flow condition for extending the thermodynamic turbine mapping of the turbocharger.

One advantage of the present invention is that a new method of extended thermodynamic turbine mapping for a turbocharger is provided. Another advantage of the present invention is that the method obtains these maps on existing gas stand test benches using a low-cost retrofit.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 4 is a graph of orifice sizing for the method of extended thermodynamic turbine mapping for the turbocharger used with the gas test stand of FIG. 1.

DETAILED DESCRIPTION OF THE INVENTION

Figure 1:
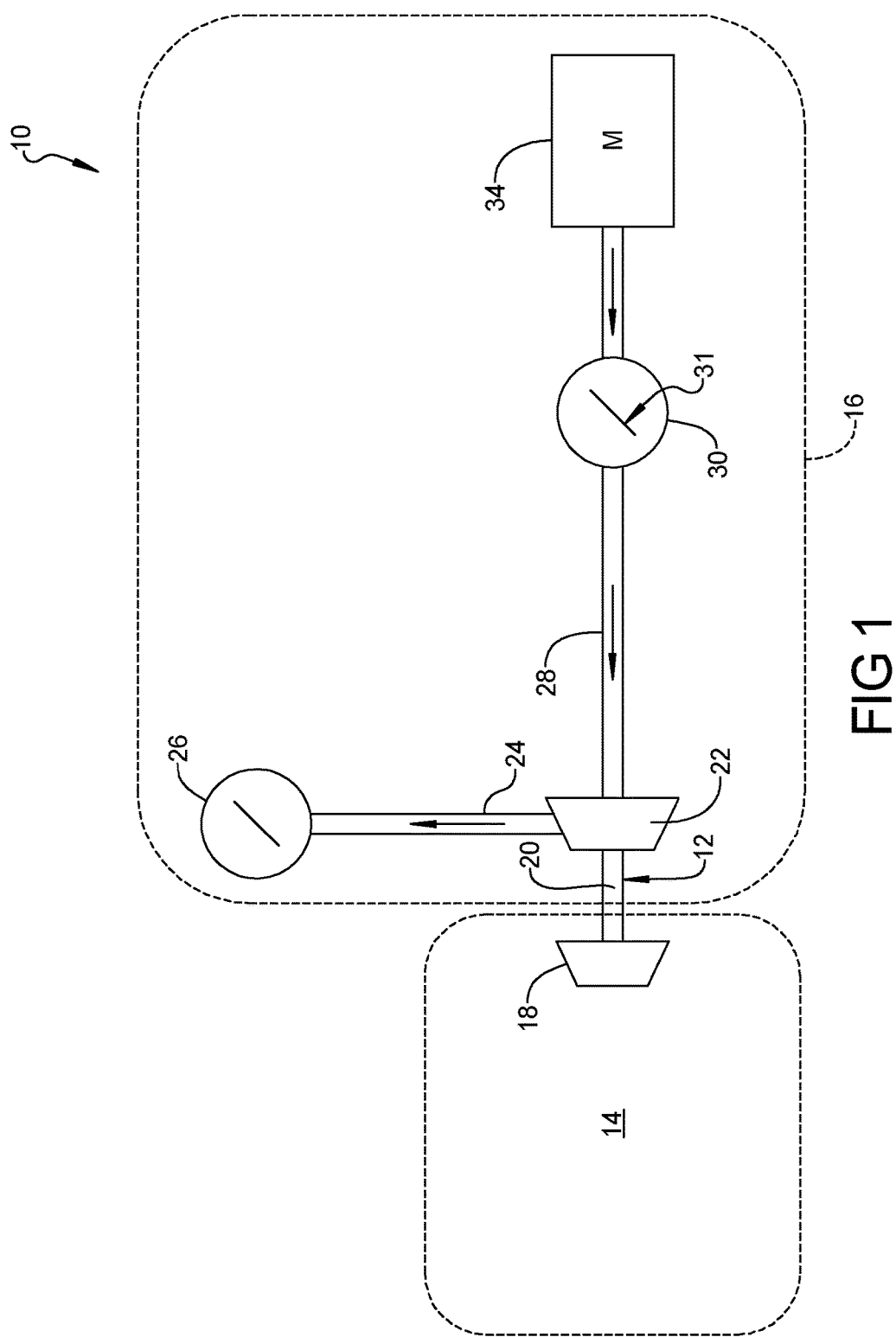
FIG. 1 is a diagrammatic view of a gas test stand for carrying out a method, according to one embodiment of the present invention, of extended thermodynamic turbine mapping for a turbocharger.

Referring now to the figures, where like numerals are used to designate like structure unless otherwise indicated, a gas test stand is generally indicated at 10 in FIG. 1 is used for carrying out a method, according to one embodiment of the present invention, of extended thermodynamic turbine mapping for a turbocharger, generally indicated at 12. In one embodiment, the gas test stand 10 is a gas stand test bench having a turbine side 14 and a compressor side 16 shown in dotted lines. It should be appreciated that, for simplicity, only a few components of the turbocharger 12 are illustrated for carrying out the method of extended thermodynamic turbine mapping for the turbocharger 12.

As illustrated in FIG. 1, the turbocharger 12 includes a rotatable turbine wheel 18, a rotatable shaft 20 connected to the turbine wheel 18, and a rotatable compressor wheel 22 connected to the shaft 20. The turbine side 14 of the gas test stand 10 includes the turbine wheel 18 and the compressor side 16 includes the compressor wheel 22 with the shaft 20 extending therebetween. It should be appreciated that the turbocharger 12 is conventional and known in the art. It should also be appreciated that an example of a turbocharger is disclosed in U.S. Pat. No. 8,632,304 to Sweetland et al., the entire disclosure of which is hereby expressly incorporated by reference.

Referring again to FIG. 1, the gas stand test bench 10 is used to support the turbocharger 12 and to carry out the method of extended thermodynamic turbine mapping for the turbocharger 12. In one embodiment, the compressor side 16 of the gas test stand 10 includes a compressor outlet measurement section 24 fluidly communicating with the compressor wheel 22 and a compressor outlet throttle valve 26 fluidly communicating with the compressor outlet measurement section 24. The gas test stand 10 also includes a compressor inlet measurement section 28 fluidly communicating with the compressor wheel 22 and a compressor inlet run 30 fluidly communicating with the compressor inlet measurement section 28. The compressor inlet run 30 includes a throttle device, generally indicated at 31. The gas stand test bench 10 includes a compressor mass flow device 34 fluidly communicating with the compressor inlet run 30. It should be appreciated that compressor inlet pressure is throttled down by installing the compressor inlet run 30 in front or upstream of the compressor of the turbocharger 12 under test.

Figure 2:
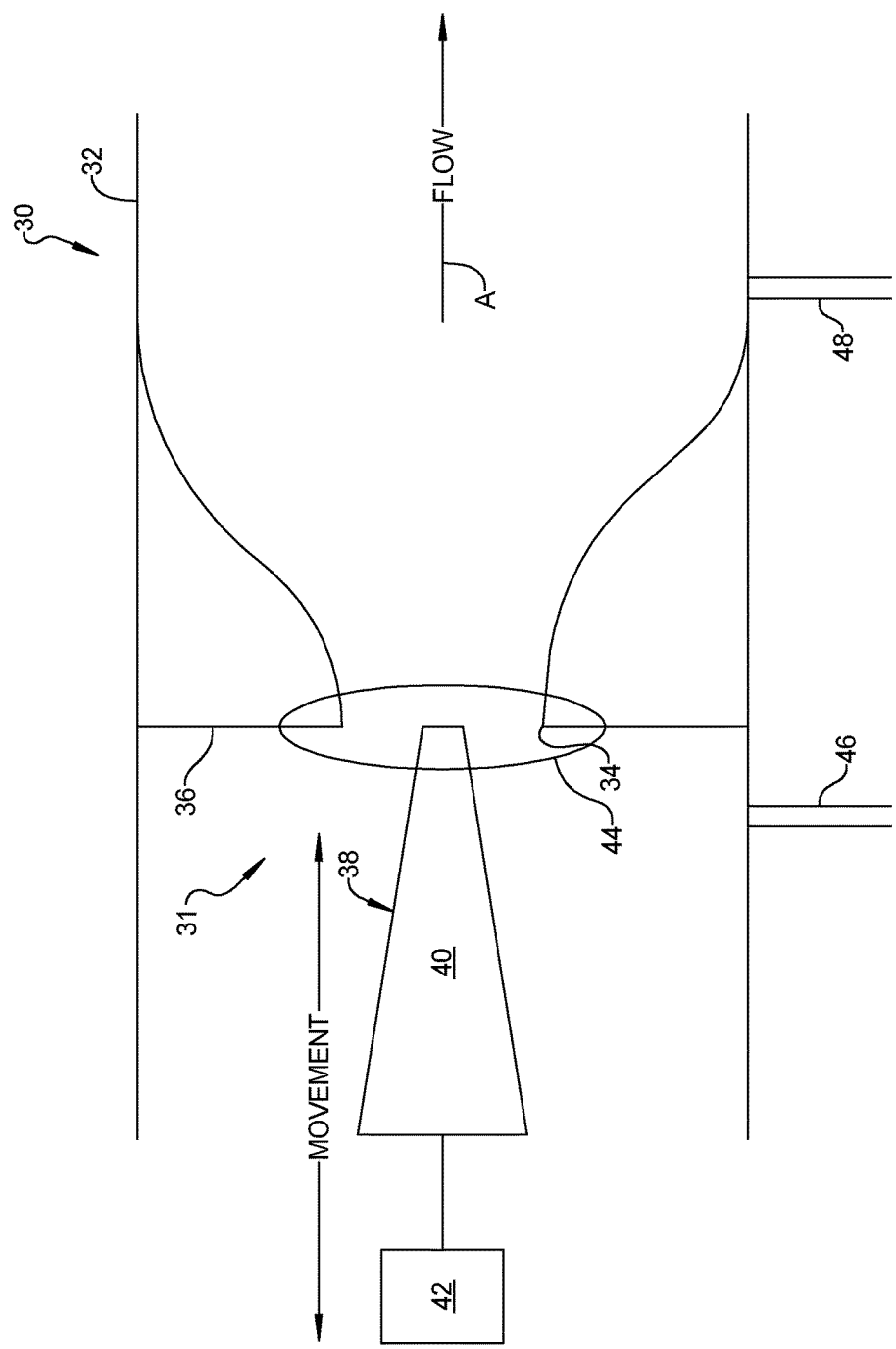
FIG. 2 is a diagrammatic view of compressor load inlet throttling for the turbocharger used with the gas test stand of FIG. 1.

Referring to FIG. 2, one embodiment of the compressor inlet run 30 is shown. The compressor inlet run 30 includes a compressor inlet pipe 32 and the throttle device 31 is disposed in the compressor inlet pipe 32. In one embodiment, the throttle device 31 is a fixed orifice 34 or a plurality of interchangeable fixed orifices 34 of different size or diameter. In one embodiment, the orifice 34 is generally annular and circular in shape. In one embodiment, the orifice 34 may be formed in an orifice plate 38. In another embodiment, the orifices 34 may be formed in a plurality of interchangeable orifice plates 36. It should be appreciated that the orifice 34 has a minimum orifice diameter to reach a target compressor operating point of the compressor of the turbocharger 12.

In another embodiment, the throttle device 31 is a compressor load throttle valve assembly 38. The compressor load throttling valve assembly 38 includes a valve member 40 that is movable relative to the orifice 34. In one embodiment, the valve member 40 is generally tapered or frusto-conical in shape. It should be appreciated that this shape preserves uniformity of flow entering the compressor of the turbocharger 12, which is required to accurately measure boundary conditions at the compressor inlet.

The compressor load throttling valve assembly 38 includes an actuator 42 coupled to the valve member 40 to move the valve member 40 relative to the orifice 34 to vary an annular orifice area 44. It should be appreciated that, in one embodiment, the actuator 42 moves the valve member 40 axially relative to the orifice 34 to vary the annular orifice area 44.

The compressor inlet run 30 also includes an upstream pressure tap 46 provided in the inlet compressor pipe 32 upstream of the orifice 34 and a downstream pressure tap 48 provided in the inlet compressor pipe 32 downstream of the orifice 34 and both communicating with the interior of the compressor inlet pipe 32. It should be appreciated that, except for the compressor inlet run 30 having the throttle device 31, the remainder of the gas test stand 10 is conventional.

In operation of the compressor load throttle valve assembly 38, a continuous flow of air travels from upstream through the orifice 34 and downstream through the compressor inlet pipe 32. The valve member 40 is moved axially relative to the orifice 34 to vary the annular orifice area 44. It should be appreciated that orifice area 44 is used to extend the thermodynamic turbine map for the turbocharger 12. It should be appreciated that the valve member 40 restricts flow, thereby decreasing pressure. It should further be appreciated that the valve member 40 is closed enough relative to the orifice 34 to produce quasi-choked flow at a target compressor operating point and this causes the compressor of the turbocharger 12 to operate in a partial vacuum, lowering the required drive power and extending the thermodynamic turbine map to the left.

In operation of the gas test stand 10 for the turbocharger 12, flow of continuous gas is provided to the turbocharger 12. The gas continuously flows from a source to the compressor mass flow measurement device 34. From the device 34, the gas continuously flows to the compressor inlet run 30 and through the throttle device 31 disposed upstream of an inlet of the compressor wheel 22 of the turbocharger 12. In the compressor inlet run 30, varying the area of the inlet with the throttle device 31 changes a density of the continuously flowing gas at the inlet of the compressor of the turbocharger 12 and establishes a choked-flow condition for extending the thermodynamic turbine mapping of the turbocharger 12. The compressor inlet pressure is throttled down by the throttle device 31 in front of the compressor of the turbocharger 12 under test. In one embodiment, the valve member 40 is moved relative to the orifice 34 such that the orifice 34 is closed enough to adjust the flow rate of the gas and produce a quasi-choked flow at the target compressor operating point. This causes the compressor of the turbocharger 12 to operate in a partial vacuum, lowering the required drive power and extending the thermodynamic turbine map (FIG. 3) to the left. It should be appreciated that the compressor outlet throttle valve 26 is used to monitor the outlet to allow a larger turbocharger to operate efficiently as smaller rates. It should also be appreciated that the throttle device 31 varies the airflow at the compressor inlet run 30.

Figure 3:
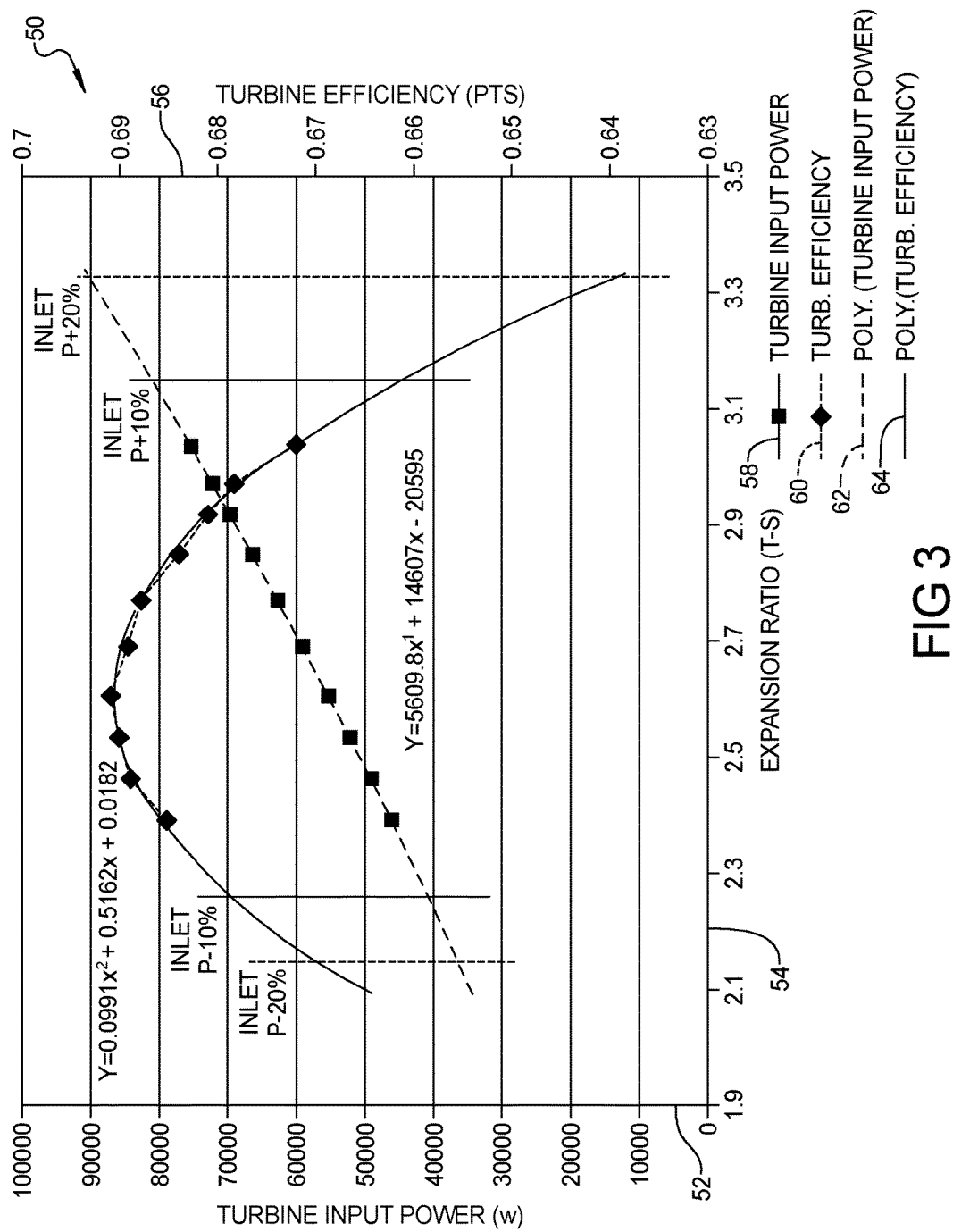
FIG. 3 is a graph of a thermodynamic turbine map used with the method of extended thermodynamic turbine mapping for the turbocharger used with the gas test stand of FIG. 1.

Referring to FIG. 3, a graph 50 of a thermodynamic turbine map for the turbocharger 12 is shown. The graph 50 has a left vertical axis 52 of turbine input power (W), a horizontal axis 54 of expansion ratio (T-S), and a right vertical axis 56 of turbine efficiency (PTS). The graph 50 also includes plots 58 60, 62, and 64 of turbine input power, turbine efficiency, polynomial curve (turbine input power), and polynomial curve (turbine efficiency), respectively. It should be appreciated that at least 10% change in loading is needed to provide a meaningful extension of the thermodynamic turbine map. It should also be appreciated that the orifice approach only extends a low side of the turbine speedline and the low side tends to be where the turbine speedline curvature is hardest to accurately extrapolate.

Referring to FIG. 4, a graph 66 of orifice sizing is shown. The graph 66 has a vertical axis 68 of minimum volume flow rate to reach quasi-choked condition (m$^3$/s) and a horizontal axis 70 of orifice actual diameter (mm). The graph 66 includes a plot 72 of a $2^{nd}$ order polynomial curve to illustrate the required minimum orifice diameter to reach a target compressor operating point M=0.9 of the turbocharger 12.

Accordingly, the present invention provides a method for extending thermodynamic turbine mapping of the turbocharger 12. The method includes the steps of providing a steady-state turbocharger gas test stand 10 configured to flow continuous gas to the turbocharger 12. The test stand 10 includes a compressor inlet run 30 having a throttle device 31 disposed upstream of an inlet of the compressor of the turbocharger 12. The method also includes the steps of varying an area of the inlet with the throttle device 31 to change a density of the continuously flowing gas at the inlet of the compressor and establishing a choked-flow condition for extending the thermodynamic turbine mapping of the turbocharger 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A method for extending thermodynamic turbine mapping of a turbocharger, the turbocharger including a turbine and a compressor, said method comprising the steps of:
    providing a steady-state turbocharger gas test stand configured to flow continuous gas to the turbocharger, the test stand including a throttle device disposed upstream of an inlet of the compressor of the turbocharger; and
    varying an area of the inlet with the throttle device to change a density of the continuously flowing gas at the inlet of the compressor and establishing a choked-flow condition for extending the thermodynamic turbine mapping of the turbocharger.

2. A method as set forth in claim 1 including the step of providing a compressor inlet run including a compressor inlet pipe and the throttle device disposed in or with the compressor inlet pipe.

3. A method as set forth in claim 2 including the step of providing the throttle device as an orifice in or with the compressor inlet pipe.

4. A method as set forth in claim 2 including the step of providing the throttle device as a plurality of interchangeable orifices of different sizes and interchanging the orifices in or with the compressor inlet pipe.

5. A method as set forth in claim 4 including the step of providing the throttle device as a plurality of interchangeable plates for the plurality of orifices and interchanging the plates in or with the compressor inlet pipe.

6. A method as set forth in claim 2 including the step of providing the throttle device as a compressor load throttle valve assembly.

7. A method as set forth in claim 6 including the step of providing the compressor load throttle valve assembly as a movable valve member and an actuator coupled to the valve member to move the valve member.

8. A method as set forth in claim 7 including the step of moving the valve member toward the inlet to produce a quasi-choked flow at a target compressor operating point of the turbocharger.

9. A method for extending thermodynamic turbine mapping of a turbocharger, the turbocharger including a turbine and a compressor, said method comprising the steps of:
    providing a steady-state turbocharger gas test stand configured to flow continuous gas to the turbocharger, the test stand including a compressor inlet run having a compressor inlet pipe and a throttle device disposed in the compressor inlet pipe upstream of an inlet of the compressor of the turbocharger; and
    varying an area of the inlet with the throttle device to change density of the continuously flowing gas at the inlet of the compressor and establishing a quasi-choked-flow condition at a target compressor operating point of the turbocharger for extending the thermodynamic turbine mapping of the turbocharger.

10. A method as set forth in claim 9 including the step of providing the throttle device as a compressor load throttle valve assembly.

11. A method as set forth in claim 10 including the step of providing the compressor load throttle valve assembly as a movable valve member and an actuator coupled to the valve member to move the valve member.

12. A method as set forth in claim 11 including the step of moving the valve member toward and away from the inlet.

13. A method as set forth in claim 9 including the step of providing the throttle device as an orifice in or with the compressor inlet pipe.

14. A method as set forth in claim 9 including the step of providing the throttle device as a plurality of interchangeable orifices of different sizes and interchanging the orifices in or with the compressor inlet pipe.

15. A gas test stand for carrying out a method for extending thermodynamic turbine mapping of a turbocharger, the turbocharger including a turbine and a compressor, said gas test stand configured to flow continuous gas to the turbocharger and comprising:
    a compressor inlet run having a compressor inlet pipe and a throttle device disposed in the compressor inlet pipe upstream of an inlet of the compressor of the turbocharger;
    the throttle device being one of;
        an orifice,
        a plurality of interchangeable orifices of different sizes, and
        a compressor load throttle valve assembly including a movable valve member and an actuator coupled to the valve member to move the valve member,
    wherein the throttle device varies an area of the inlet to change a density of the continuously flowing gas at the inlet of the compressor and establishes a choked-flow condition for extending the thermodynamic turbine mapping of the turbocharger.

* * * * *